United States Patent
Lee

(10) Patent No.: US 9,573,012 B1
(45) Date of Patent: Feb. 21, 2017

(54) MULTI-FUNCTIONAL CHAIR

(71) Applicant: SUPERWEIGH ENTERPRISE CO., LTD., Tsao-Tun Chen (TW)

(72) Inventor: Sunny Lee, Tsao-Tun Chen (TW)

(73) Assignee: Superweigh Enterprise Co., Ltd., Tsao-Tun Chen, Nan-Tou Hsien (TW)

( * ) Notice: Subject to any disclaimer, the term of this patent is extended or adjusted under 35 U.S.C. 154(b) by 0 days.

(21) Appl. No.: 14/868,841

(22) Filed: Sep. 29, 2015

(51) Int. Cl.
*A63B 26/00* (2006.01)
*A63B 21/00* (2006.01)
*A47C 1/0355* (2013.01)
*A63B 23/02* (2006.01)

(52) U.S. Cl.
CPC ......... *A63B 21/0004* (2013.01); *A47C 1/0355* (2013.01); *A63B 23/0205* (2013.01); *A63B 23/0233* (2013.01)

(58) Field of Classification Search
CPC ......... A47C 1/031; A47C 1/034; A47C 1/035; A47C 1/0355; A47C 9/002; A63B 21/00058; A63B 21/00061; A63B 21/00065; A63B 21/000178; A63B 21/00181; A63B 21/00185; A63B 21/02; A63B 21/023; A63B 21/025; A63B 21/04; A63B 21/0407; A63B 21/0414; A63B 21/0421; A63B 21/0428; A63B 21/0435; A63B 21/0442; A63B 21/045; A63B 21/0455; A63B 21/055; A63B 21/0552; A63B 21/0555; A63B 21/0557; A63B 21/0615; A63B 21/068; A63B 21/08; A63B 21/16; A63B 21/1609; A63B 21/4027; A63B 21/4029; A63B 21/4033; A63B 21/4034; A63B 21/4039; A63B 21/4045; A63B 21/4047; A63B 21/4049; A63B 23/02; A63B 23/0205; A63B 23/0211; A63B 23/0216; A63B 23/0222; A63B 23/0233; A63B 23/0238; A63B 2208/02; A63B 2208/0228; A63B 2208/0233; A63B 2225/09; A63B 2225/093

See application file for complete search history.

(56) References Cited

U.S. PATENT DOCUMENTS

| | | | | |
|---|---|---|---|---|
| 1,238,078 A | * | 8/1917 | Ault ..................... | A47C 1/0355 297/317 |
| 3,767,190 A | * | 10/1973 | Biggerstaff ............ | A47C 1/034 297/318 |
| 4,341,420 A | * | 7/1982 | Knowles .............. | A47C 3/0255 297/280 |
| 5,100,131 A | * | 3/1992 | Fong .................... | A61H 1/0292 482/112 |

(Continued)

*Primary Examiner* — Stephen Crow
*Assistant Examiner* — Gary D Urbiel Goldner
(74) *Attorney, Agent, or Firm* — Pepper Hamilton LLP

(57) ABSTRACT

A multi-functional chair includes a front leg frame, a footrest assembly connected pivotally to and extending obliquely upward from a bottom end of the front leg frame, a link rod assembly connected pivotally to the footrest assembly, a seat cushion connecting rod connected pivotally to the link rod assembly, a supporting frame connected pivotally to the seat cushion connecting rod, a seat cushion supported on the supporting frame, a backrest frame connected to and extending obliquely upward from the seat cushion connecting rod, a pivot seat connected pivotally to a top end of the backrest frame, and a backrest fixed to the pivot seat.

10 Claims, 8 Drawing Sheets

(56) References Cited

U.S. PATENT DOCUMENTS

| | | | | |
|---|---|---|---|---|
| 5,348,367 | A * | 9/1994 | Mizelle | A47C 1/035 297/321 |
| 5,505,679 | A * | 4/1996 | McBride | A63B 21/0083 482/112 |
| 5,527,243 | A * | 6/1996 | Chen | A63B 21/068 482/57 |
| 5,580,340 | A * | 12/1996 | Yu | A63B 21/055 482/72 |
| 5,599,261 | A * | 2/1997 | Easley | A63B 21/0552 482/130 |
| 5,669,865 | A * | 9/1997 | Gordon | A63B 23/00 482/142 |
| 5,676,626 | A * | 10/1997 | Huang | A63B 23/03575 482/72 |
| 5,702,334 | A * | 12/1997 | Lee | A63B 23/0227 482/131 |
| 5,833,590 | A * | 11/1998 | Chiu | A63B 21/0552 482/112 |
| 6,113,524 | A * | 9/2000 | Huang | A63B 23/03575 482/142 |
| 6,213,923 | B1 * | 4/2001 | Cameron | A63B 21/012 297/50 |
| 6,254,517 | B1 * | 7/2001 | Kennedy | A63B 21/04 482/121 |
| 6,387,024 | B1 * | 5/2002 | Monti | A63B 21/00072 482/130 |
| 6,752,748 | B1 * | 6/2004 | Scotti | A63B 21/0615 482/140 |
| 7,229,389 | B2 * | 6/2007 | Hong | A63B 21/0552 482/142 |
| 7,294,096 | B1 * | 11/2007 | Stearns | A63B 23/0211 482/121 |
| 7,794,376 | B2 * | 9/2010 | Chou | A63B 21/00181 482/137 |
| 7,833,143 | B1 * | 11/2010 | Tsai | A63B 21/0552 482/140 |
| 8,016,731 | B2 * | 9/2011 | Vanterpool | A63B 21/068 482/133 |
| D664,615 | S * | 7/2012 | Chuang | D21/687 |
| 8,556,780 | B2 * | 10/2013 | Chen | A63B 21/023 482/140 |
| 8,696,534 | B2 * | 4/2014 | Karwan | A47C 7/40 297/68 |
| 8,747,287 | B2 * | 6/2014 | Li | A63B 21/00058 482/121 |
| 2002/0123414 | A1 * | 9/2002 | Chen | A63B 21/023 482/123 |
| 2006/0281610 | A1 * | 12/2006 | Perez, Jr. | A63B 23/0211 482/130 |
| 2007/0037677 | A1 * | 2/2007 | Splane, Jr. | A63B 21/4047 482/121 |
| 2007/0111861 | A1 * | 5/2007 | Nativ | A63B 21/0552 482/51 |
| 2007/0111869 | A1 * | 5/2007 | Wallach | A63B 21/0552 482/129 |
| 2007/0287619 | A1 * | 12/2007 | Tuller | A63B 21/4047 482/140 |
| 2008/0146419 | A1 * | 6/2008 | Chu | A63B 21/00185 482/96 |
| 2008/0203776 | A1 * | 8/2008 | Mongelluzzo | A47C 9/002 297/118 |
| 2009/0197746 | A1 * | 8/2009 | Splane, Jr. | A63B 21/02 482/121 |
| 2009/0270235 | A1 * | 10/2009 | Solow | A63B 21/023 482/142 |
| 2010/0022368 | A1 * | 1/2010 | Fernandez | A63B 21/055 482/140 |
| 2010/0069801 | A1 * | 3/2010 | Tsai | A63B 21/4047 601/134 |
| 2010/0190623 | A1 * | 7/2010 | Guissin | A47C 1/023 482/142 |
| 2014/0159437 | A1 * | 6/2014 | Humphreys | A47C 1/035 297/90 |
| 2014/0274618 | A1 * | 9/2014 | Ho | A63B 21/159 482/140 |
| 2016/0073786 | A1 * | 3/2016 | Walker | A47C 7/563 297/325 |
| 2016/0199687 | A1 * | 7/2016 | Ho | A63B 23/0205 482/66 |

* cited by examiner

MULTI-FUNCTIONAL CHAIR

FIELD

The disclosure relates to a chair, more particularly to a multi-functional chair.

BACKGROUND

People nowadays are increasingly paying attention to the concept of health care. Body fitness has become a new manner of exercising. Along with the development and progress of modern science and technology, exercise equipments for assisting users in performing training of their body parts have emerged, such as treadmills, steppers, sit-up boards, etc. However, most of the exercise equipments can only be used for a single kind of training program, and cannot permit the user to use the same equipment for training various body parts. In addition, since most of the exercise equipments have bulky volumes, if the consumers buy and place them in their homes, the exercise equipments will take up a lot of interior space when not in use. This causes the people to reduce their desire to buy the exercise equipment, and choose to do the body training at the gym or fitness center, instead of doing the fitness training at their own homes.

Further, in an exercise using a sit-up board of one of the aforementioned exercise equipment, the user mainly rely on the strength of the waist to raise his upper body. However, the user often ends up with waist muscle strain because the backward leaning angle is too large and the applied force is excessive.

SUMMARY OF THE DISCLOSURE

Therefore, an object of the disclosure is to provide a multi-functional chair that can alleviate at least one of the drawbacks of the prior arts.

According to this disclosure, a multi-functional chair comprises a support unit, a drive unit, a seat cushion unit and a backrest unit.

The support unit includes a main frame extending obliquely upward and rearward, a front leg frame disposed on a front side of the main frame, and a plurality of spaced-apart rear leg frames disposed on a rear side of the main frame. The drive unit includes a footrest assembly connected pivotally to and extending obliquely upward from a bottom end of the front leg frame, a link rod assembly connected pivotally to the footrest assembly and foldably received in the front leg frame, and a seat cushion connecting rod connected pivotally to the link rod assembly and having a portion foldably received in the main frame.

The seat cushion unit includes a supporting frame connected pivotally to a front end of the seat cushion connecting rod, and a seat cushion supported on the supporting frame and located rearwardly of the footrest assembly. The backrest unit includes a backrest frame connected to and extending obliquely upward from the seat cushion connecting rod, a pivot seat connected pivotally to a top end of the backrest frame, and a backrest fixed to the pivot seat and located above the seat cushion.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
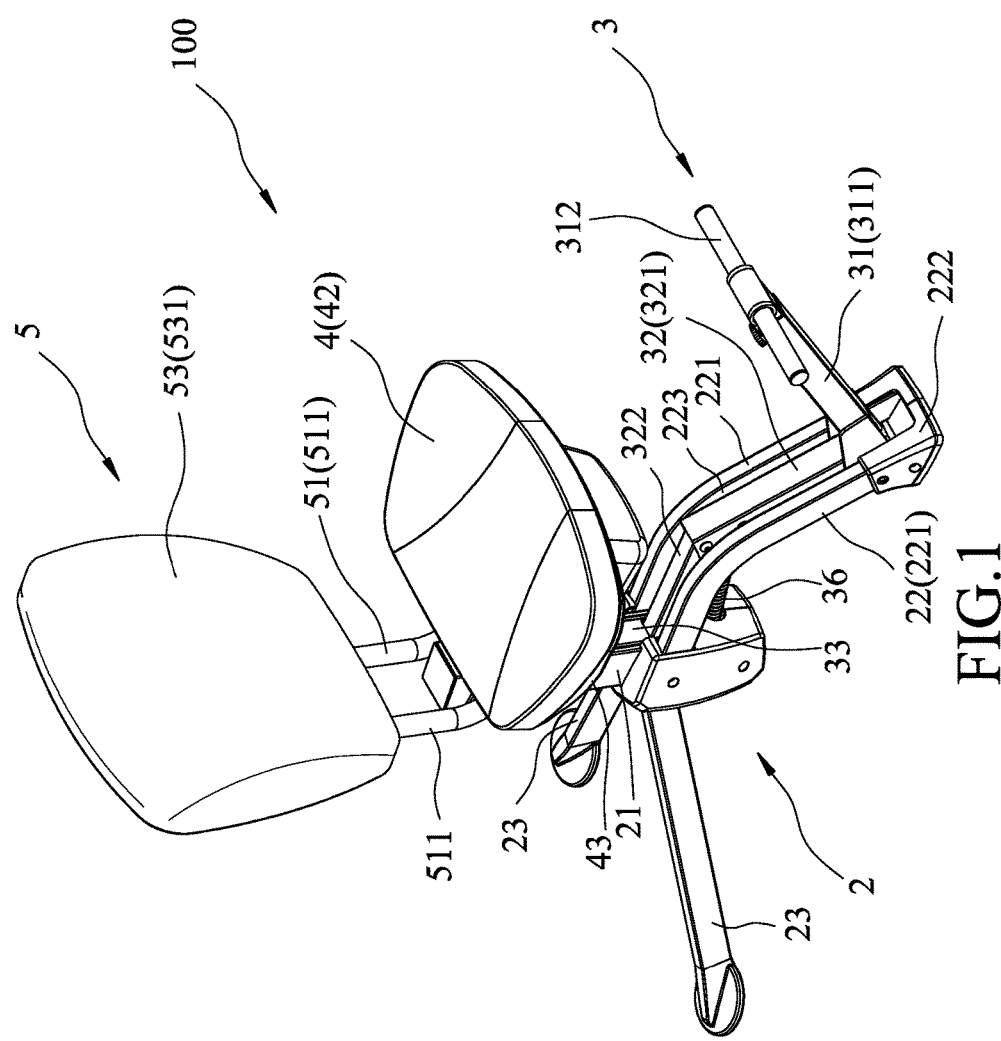
FIG. 1 is a perspective view of a multi-functional chair according to the embodiment of the present disclosure.
Figure 2:
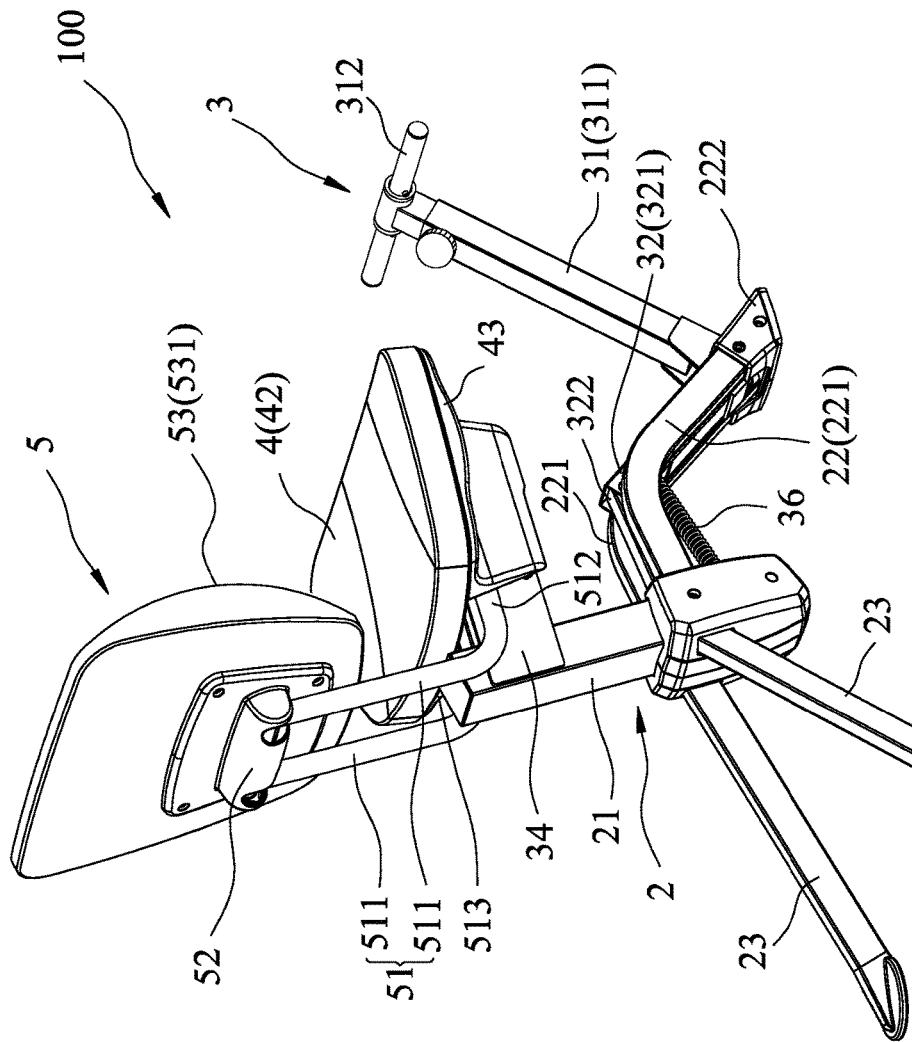
FIG. 2 is another perspective view of the embodiment taken from another angle.

Referring to FIGS. 1 to 4, a multi-functional chair 100 according to the embodiment of the disclosure is shown to comprise a support unit 2, a drive unit 3, a seat cushion unit 4 and a backrest unit 5.

The support unit 2 includes a main frame 21 extending obliquely upward and rearward, a front leg frame 22 disposed on a front side of the main frame 21, and two rear leg frames 23 extending rearwardly and downwardly from a rear side of the main frame 21 in opposite directions.

The front leg frame 22 includes two front legs 221 respectively mounted on and extending from two opposite lateral sides of the main frame 21 forwardly and then obliquely downwardly, and a protective cover 222 sleeved on bottom ends of the front legs 221. The front legs 221 and the protective cover 222 cooperate to define a receiving space 223.

The drive unit 3 is a four-bar linkage, and includes a footrest assembly 31, a link rod assembly 32, a seat cushion connecting rod 33, two fixing plates 34, a coupling rod 35, and an elastic element 36.

The footrest assembly 31 includes a telescopic rod 311 connected pivotally to and extending obliquely upward from the bottom ends of the front legs 221, and a footrest rod 312 transversely disposed on an end of the telescopic rod 311 opposite to the bottom ends of the front legs 221.

The link rod assembly 32 is a two-bar linkage, and includes a first link rod 321 connected pivotally to the telescopic rod 311, and a second link rod 322 having one end connected pivotally to the first link rod 321 opposite to the telescopic rod 311, and the other end opposite to the first link rod 321. The first and second link rods 321, 322 are foldably received in the receiving space 223 when the chair 100 is in a sitting state.

The seat cushion connecting rod 33 has an inverted L-shape, and includes a first connecting rod portion 331 having one end slidably connected to the main frame 21 and the other opposite end connected pivotally to the other end of the second link rod 322, and a second connecting rod portion 332 extending transversely and forwardly from a top end of the first connecting rod portion 331. The first connecting rod portion 331 is foldably received in the main frame 21 when the chair 100 is in the sitting state.

The fixing plates 34 respectively have rear end portions fixed on the two opposite lateral sides of the main frame 21, and front end portions opposite to the rear end portions. The second connecting rod portion 332 is connected pivotally to the front end portions of the fixing plates 34 such that the second connecting rod portion 332 is disposed between the fixing plates 34. The fixing plates 34 are disposed higher than the front leg frame 22 and the rear leg frames 23.

The coupling rod 35 has a rear end connected pivotally to the front end portions of the fixing plates 34, and a front end opposite to the rear end thereof. The coupling rod 35 is located below and parallel to the second connecting rod portion 332.

The elastic element 36 is connected to and extends between the main frame 21 and the first link rod 321, and is capable of providing a restoring force. The elastic element 36 is a tension spring in this embodiment.

The seat cushion unit 4 includes a supporting frame 41, a seat cushion 42 and two gripping portions 43. The supporting frame 41 includes a pivot connecting seat 411 connected pivotally to the front ends of the second connecting rod portion 332 and the coupling rod 35, and a supporting member 412 connected to a top end of the pivot connecting seat 411. The seat cushion 42 is disposed on the supporting frame 41, and is located rearwardly of the footrest assembly 31. The gripping portions 43 are fixed to a bottom surface of the seat cushion 42 in proximity to left and right lateral edges thereof.

It is worth to mention herein that, during the sliding movement of the seat cushion connecting rod 33 relative to the main frame 21, the coupling rod 35 remains parallel to the second connecting rod portion 332, and a line connecting the pivot points of the coupling rod 35, the second connecting rod portion 332, the pivot connecting seat 411 and a corresponding one of the fixing plates 34 has a parallelogram-like shape.

The backrest unit 5 includes a backrest frame 51, a pivot seat 52 and a backrest 53. The backrest frame 51 includes two spaced-apart L-shaped curved tubes 511 each of which has a first tube portion 512 and a second tube portion 513 extending obliquely upwardly from a rear end of the first tube portion 512. The first tube portions 512 of the curved tubes 511 are respectively connected to two opposite sides of the second connecting rod portion 332. The pivot seat 52 is connected pivotally to top ends of the second tube portions 513 of the curved tubes 511. The backrest 53 is connected pivotally to the pivot seat 52, is located above the seat cushion 42, and has a forwardly curved abutment surface 531.

Figure 3:
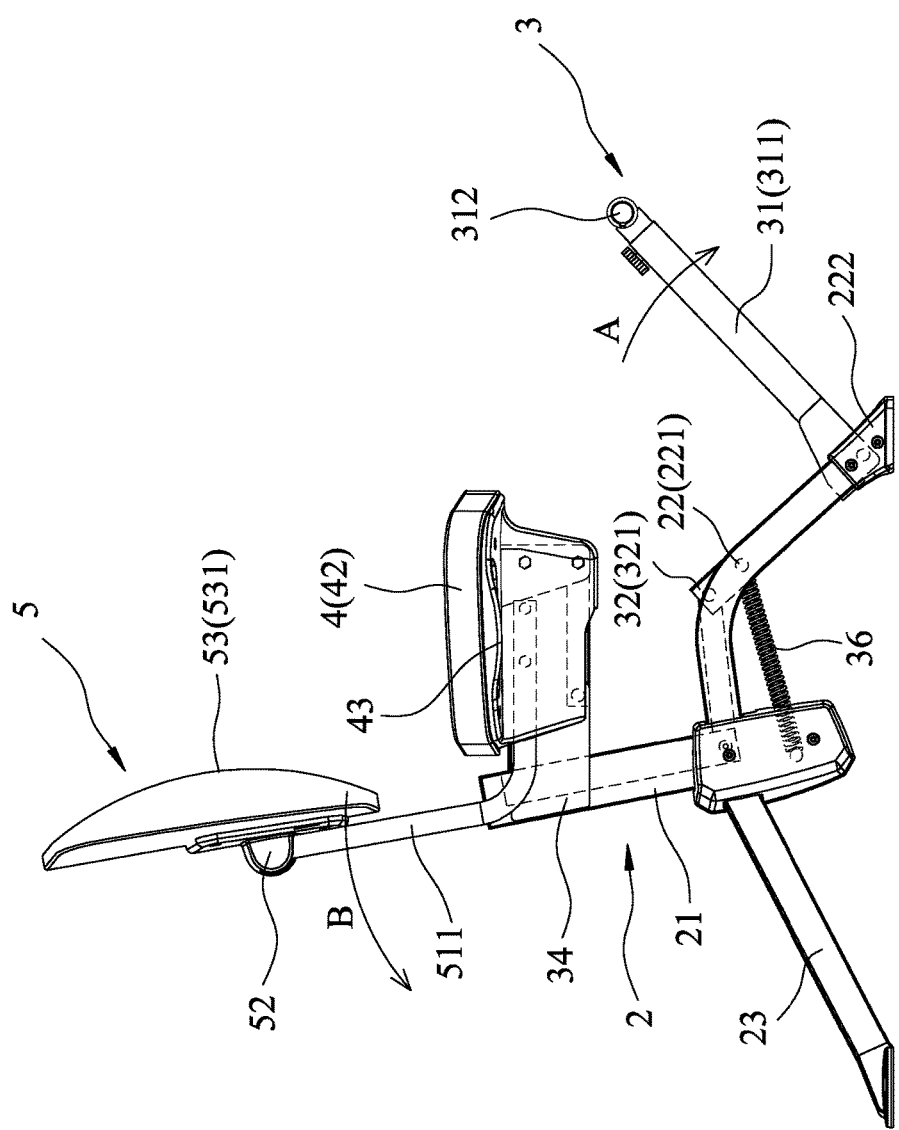
FIG. 3 is a side view of the embodiment.
Figure 4:
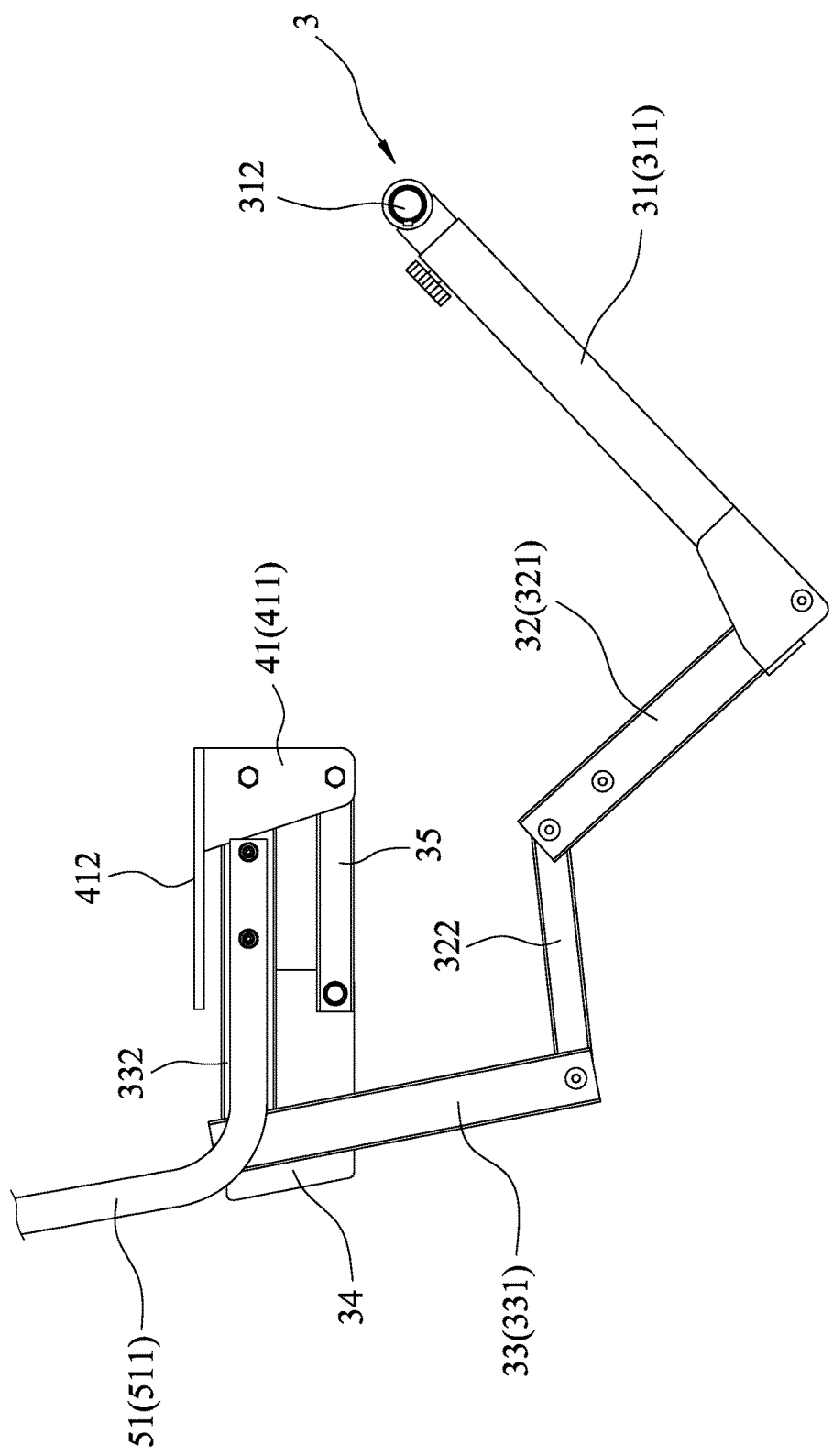
FIG. 4 is an enlarged fragmentary side view of the embodiment, illustrating how a drive unit is connected to a supporting frame and a backrest frame.
Figure 5:
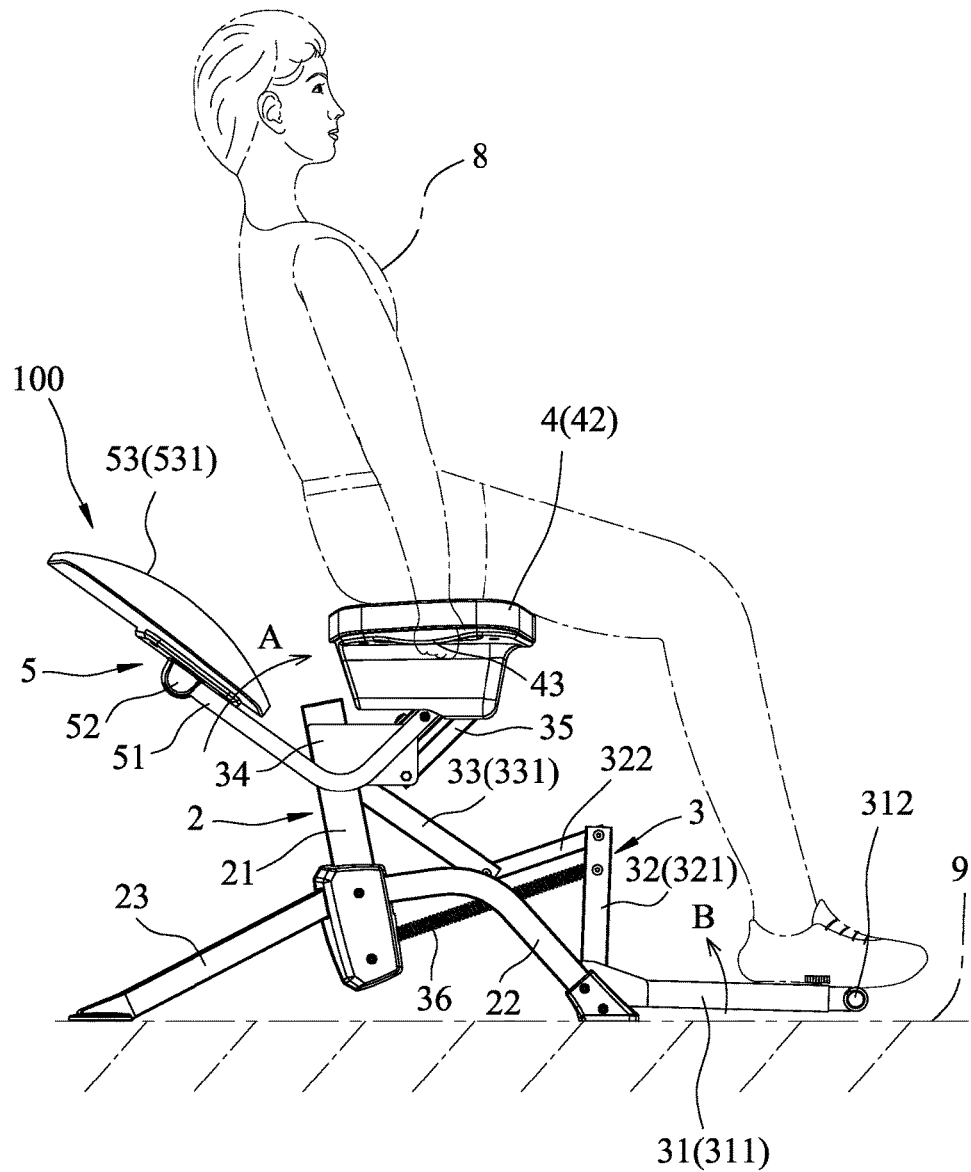
FIG. 5 illustrates the embodiment in a stepping exercise state for a user to perform a stepping exercise.

Referring to FIG. 5, in combination with FIG. 3, to use the multi-functional chair 100 of this embodiment, the chair 100 is first placed on a horizontal support surface 9 and is in a state for sitting. Afterwards, the user 8 sits on the seat cushion 42 and places his feet on the footrest rod 312. Then, by straightening his legs and exerting a downward force on the footrest rod 312, the footrest assembly 31 is moved toward the horizontal support surface 9 in the direction of an arrow (A) shown in FIG. 3, and drives the link rod assembly 32 and the seat cushion connecting rod 33 to move therealong, thereby driving the seat cushion 42 to move upward and the backrest frame 51 to move rearward in the direction of an arrow (B) which is opposite to the arrow (A). Thus, the chair 100 is switched from the sitting state shown in FIG. 3 to a state shown in FIG. 5 where the user 8 can perform a stepping exercise. In this exercise, the user 8 uses the force of his two legs for supporting the weight of his upper body part and resisting the restoring force of the elastic element 36. When the user 8 bends his knees, the footrest assembly 31 can rotate in the direction of the arrow (B), and drives the link rod assembly 32 and the seat cushion connecting rod 33 to move therealong, thereby driving the backrest frame 51 to move forward in the direction of the arrow (A) back to its original position shown in FIG. 3 and to lower the seat cushion 42 back to its original position shown in FIG. 3. A cycle of a stepping operation is thus completed. By repeating the straightening of the legs and the bending of the knees, an effect of training the leg muscles is achieved. It should be noted herein that, during this exercise, both hands of the user 8 grip the gripping portions 43 to maintain his body balance.

It is worth to mention herein that, during execution of the aforementioned stepping exercise, the location where the user 8 sits on the seat cushion 42 can affect the amount of force exerted by his two legs. When the sitting position of the user 8 is near the front end of the seat cushion 42, the center of gravity of the user 8 is also near the pivot connecting points of the footrest assembly 31 and the link rod assembly 32. According to the principle of leverage, at this moment, a large amount of force is required to straighten the legs from the bent knee position. On the contrary, when the sitting position of the user 8 is near the rear end of the seat cushion 42, the amount of force required to straighten the legs is small. Thus, the user 8 can adjust the intensity of his training by changing his sitting location.

Figure 6:
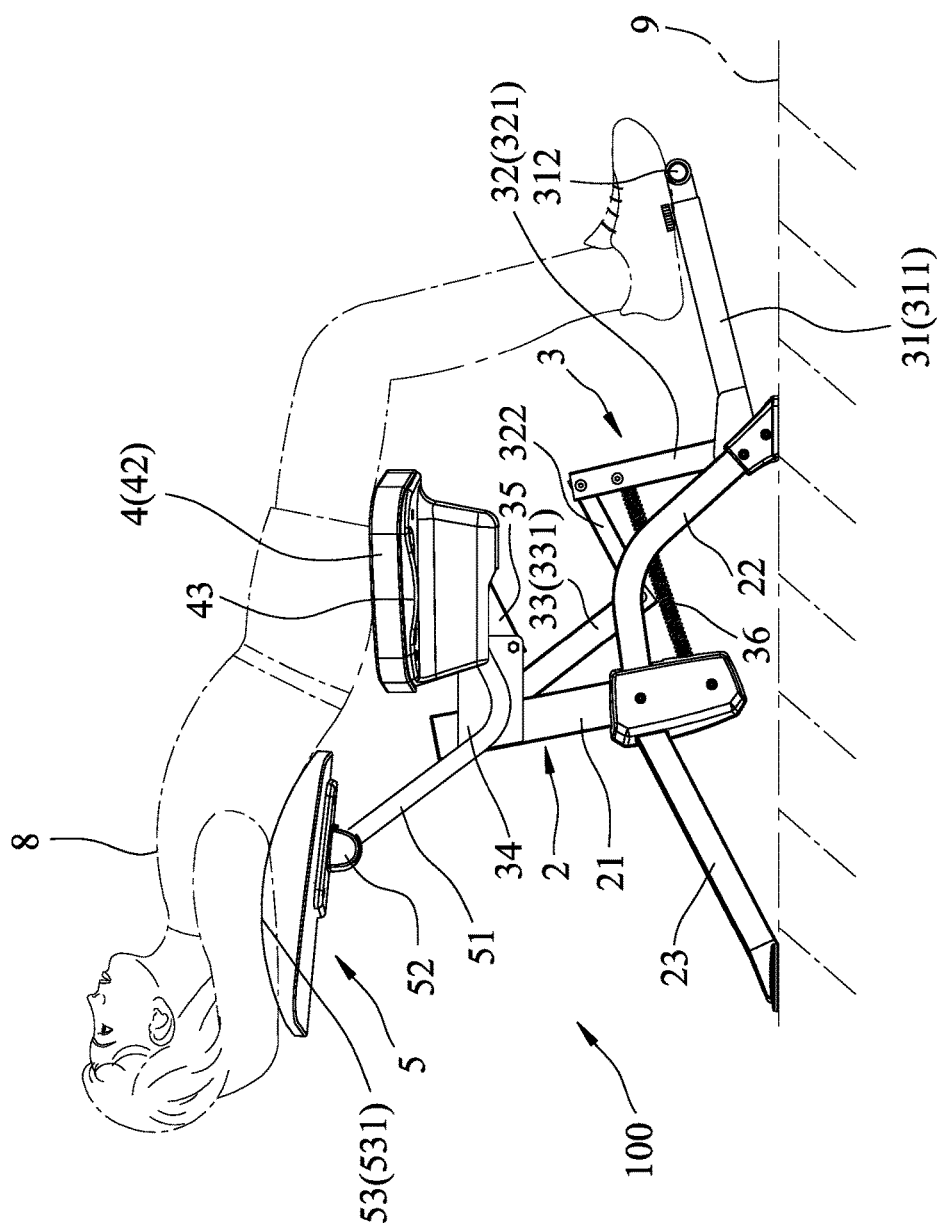
FIG. 6 illustrates the embodiment in a sit-up exercise state for a user to perform a sit-up exercise.

Referring to FIG. 6, in combination with FIG. 3, in this exercise, the user 8 sits on the seat cushion 42, and his feet exert a downward force on the footrest assembly 31 so as to move the footrest assembly 31 in the direction of the arrow (A) shown in FIG. 3. When the footrest assembly 31 reaches a position that forms an angle of about 15 degrees relative to the horizontal support surface 9, the seat cushion 42 is driven to move upward, and the backrest frame 51 is driven to move in the direction of the arrow (B). The user 8 then leans backward until his upper body part abuts against the abutment surface 531 of the backrest 53. According to his personal requirement, the user 8 can use his back to exert a force on the backrest 53 to adjust an inclination angle of the backrest 53 relative to the main frame 21 so as to switch the chair 100 to a sit-up exercise state. At this time, the user 8 uses the applied force of his two legs on the footrest assembly 31 to maintain the position of the backrest 53, and can repeatedly perform sit-ups to effect the training of his waist muscles.

It is worth to mention herein that, when the user 8 sits up during the sit-up exercise, apart from using the strength of his waist, the user 8 further uses his buttocks to press downward the seat cushion connecting rod 33 and the restoring force of the elastic element 36 so as to restore the seat cushion unit 4 and the backrest unit 5 to their original positions, thereby reducing the burden of the waist and the spine. As such, injury and strain caused by inappropriate exercise using a conventional sit-up board can be avoided.

Figure 7:
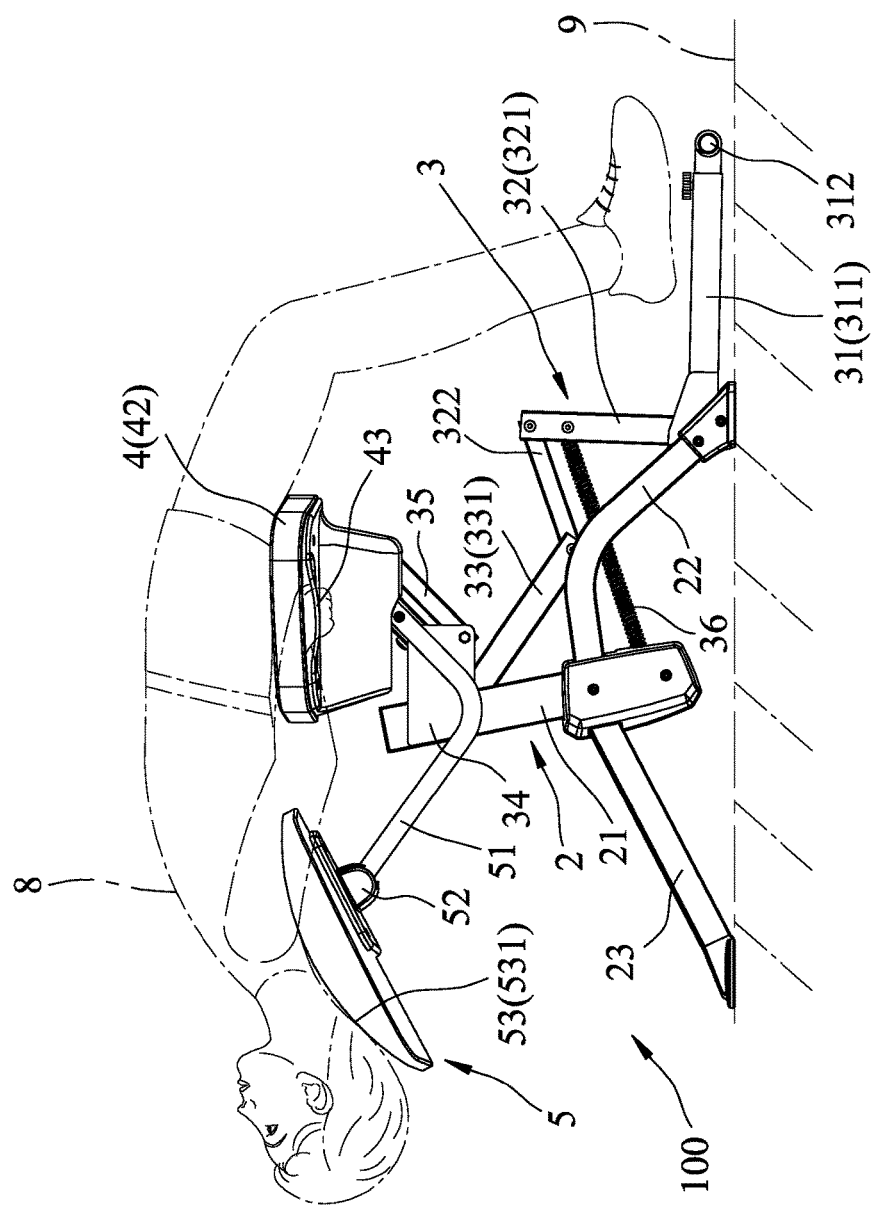
FIG. 7 illustrates the embodiment in a stretching exercise state for a user to perform a stretching exercise.

Referring to FIG. 7, in combination with FIG. 6, at the sit-up position, the user can grip the gripping portions 43 with his two hands, and then uses his back to press downward the backrest 53 so as to increase the angle of inclination of the backrest 53 relative to the main frame 21. Consequently, the seat cushion 42 is driven to rise slightly and the footrest assembly 31 is driven to move near the horizontal support surface 9, so that the backrest 53 is rotated to a position slightly lower than the seat cushion 42. At this moment, the chair 100 is switched from the sit-up exercise state to a stretching exercise state, where the user 8 can fully stretch the muscles of his back, waist and legs. Moreover, in this embodiment, through the forwardly curved abutment surface 531 of the backrest 53, when the back of the user 8 abuts against the abutment surface 531, the backward leaning of the user can be increased, so that the effect of stretching the back of the user 8 can be enhanced.

Figure 8:
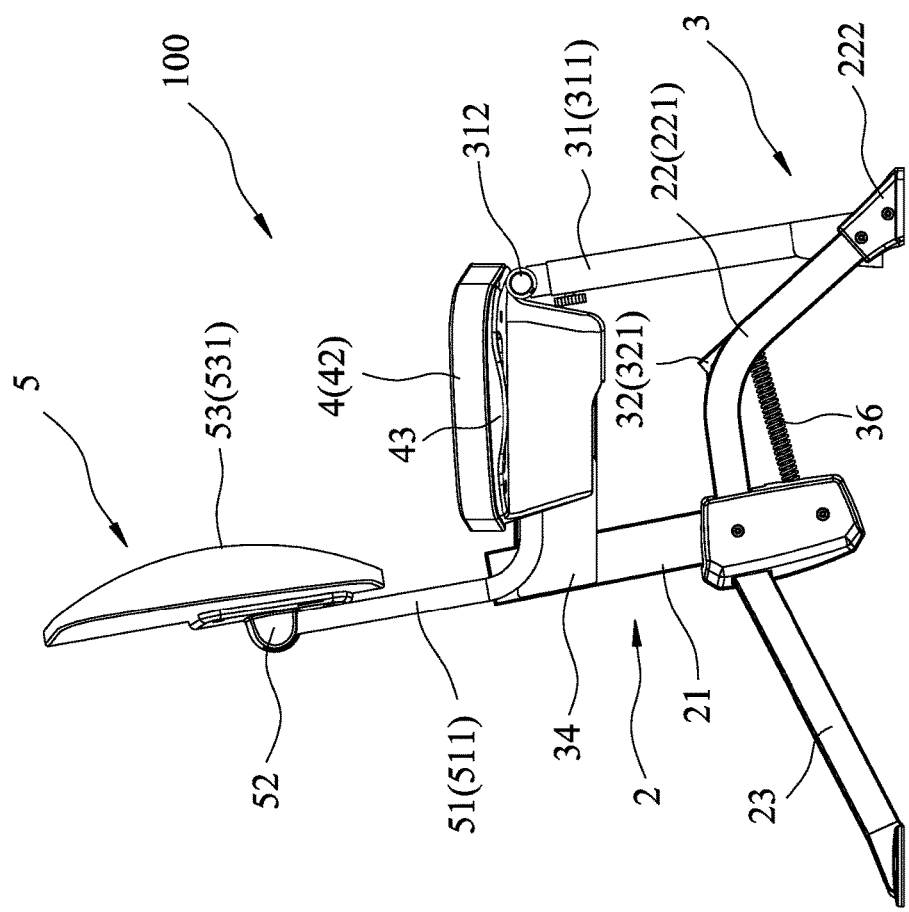
FIG. 8 illustrates the embodiment being an ordinary chair.

Referring to FIG. 8, the chair 100 of this embodiment not only can permit the user to perform the aforesaid three different exercises, the chair 100 can also be switched to an ordinary chair by moving the footrest assembly 31 toward the seat cushion 42 so as to abut the footrest rod 312 against the bottom surface of the seat cushion 42. Hence, the multi-functional chair 100 of the disclosure is suitable to be placed in an office or home as an office chair or home chair after purchased by a consumer. Further, the multi-functional chair 100 will not occupy a substantial space, and can provide body training during work or leisure time of the user 8.

From the aforesaid description, the advantages of the multi-functional chair 100 of the disclosure can be summarized as follows:

1) Through the connecting relationship among the drive unit 3, the seat cushion unit 4 and the backrest unit 5, when the user 8 exerts a downward force upon the footrest assembly 31, the link rod assembly 32 and the seat cushion connecting rod 33 are driven to raise the seat cushion 42 and move the backrest 53 obliquely rearward so as to switch the chair 100 from the sitting state to a stepping exercise state. Furthermore, through the provision of the pivot seat 52 and with the user's back pressing against the backrest 53, the chair 100 can be switched from the stepping exercise state to a sit-up or stretching exercise state so as to achieve the effect of multiple exercising modes.

2) Through the pivot connection among the seat cushion connecting rod 33, the pivot connecting seat 41 and the backrest frame 51, when the user 8 sits up, his body weight can press against the seat cushion 42 for assisting the seat cushion unit 4 and the backrest unit 5 to restore to their original position shown in FIG. 1 so as to reduce the burden of a specific portion of his body, thereby reducing the hazard of getting strain. Hence, the safe use of the chair 100 during operation can be enhanced.

3) When the seat cushion unit 4 and the backrest unit are disposed at their original position, the multi-functional chair 100 of this disclosure can be used as an ordinary chair, and does not occupy a substantial space. Further, with the user 8 sitting on the multi-functional chair 100, he can perform exercise anytime.

While the disclosure has been described in connection with what is considered the most practical embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A multi-functional chair comprising:
a support unit including a main frame extending obliquely upward and rearward, a front leg frame disposed on a front side of said main frame, and a plurality of spaced-apart rear leg frames disposed on a rear side of said main frame;
a drive unit including a footrest assembly connected pivotally to and extending obliquely upward from a bottom end of said front leg frame, a link rod assembly connected pivotally to said footrest assembly and foldably received in said front leg frame wherein said link rod assembly is configured to be selectively positioned substantially collinear with said front leg frame, and a seat cushion connecting rod connected pivotally to said link rod assembly and having a portion foldably received in said main frame wherein said portion of said seat cushion connecting rod is configured to be selectively positioned substantially collinear with said main frame;
a seat cushion unit including a supporting frame connected pivotally to a front end of said seat cushion connecting rod, and a seat cushion supported on said supporting frame and located rearwardly of said footrest assembly; and
a backrest unit including a backrest frame connected to and extending obliquely upward from said seat cushion connecting rod, a pivot seat connected pivotally to a top end of said backrest frame, and a backrest fixed to said pivot seat and located above said seat cushion.

2. The multi-functional chair as claimed in claim 1, said link rod assembly includes a first link rod connected pivotally to said footrest assembly, and a second link rod having two opposite ends connected pivotally and respectively to said first link rod and said seat cushion connecting rod.

3. The multi-functional chair as claimed in claim 2, wherein said seat cushion connecting rod includes a first connecting rod portion having two opposite ends, one end of which is connected slidably to said main frame and the other end of which is connected pivotally to said second link rod, and a second connecting rod portion extending transversely and forwardly from a top end of said first connecting rod portion and connected pivotally to said supporting frame, said portion of said seat cushion connecting rod that is foldably received in said main frame being said first connecting rod portion.

4. The multi-functional chair as claimed in claim 3, wherein said drive unit further includes two fixing plates respectively having front end portions, and rear end portions mounted on two opposite lateral sides of said main frame, said second connecting rod portion being connected pivotally to said front end portions of said fixing plates, said drive unit further including a coupling rod that has a rear end connected pivotally to said front end portions of said fixing plates, and a front end connected pivotally to said supporting frame, said coupling rod being spaced apart from and parallel to said second connecting rod portion, said fixing plates being disposed higher than said front leg frame and said plurality of spaced-apart rear leg frames, said coupling rod remaining parallel to said second connecting rod portion during sliding movement of said seat cushion connecting rod relative to said main frame.

5. The multi-functional chair as claimed in claim 3, wherein said backrest frame includes two spaced-apart L-shaped curved tubes disposed on two opposite sides of said second connecting rod portion, and said pivot seat is connected pivotally to top ends of said L-shaped curved tubes.

6. The multi-functional chair as claimed in claim 2, wherein said drive unit further includes an elastic element connected to and extending between said main frame and said first link rod, said elastic element being capable of providing a restoring force for respectively restoring said seat cushion unit and said backrest unit to an original position.

7. The multi-functional chair as claimed in claim 1, wherein said front leg frame includes two front legs respectively mounted on and extending from two opposite lateral sides of said main frame forwardly and then obliquely downwardly, and a protective cover sleeved on bottom ends of said front legs, said front legs and said protective cover cooperating to define a receiving space for receiving said link rod assembly.

8. The multi-functional chair as claimed in claim 1, wherein said footrest assembly includes a telescopic rod connected pivotally to said link rod assembly, and a footrest rod transversely disposed on an end of said telescopic rod opposite to said link rod assembly.

9. The multi-functional chair as claimed in claim 1, wherein said seat cushion unit further includes two gripping portions disposed on a bottom surface of said seat cushion in proximity to left and right lateral edges thereof.

10. The multi-functional chair as claimed in claim 1, wherein said backrest has a forwardly curved abutment surface for contact with the body of a user.

\* \* \* \* \*